Feb. 9, 1960 W. R. YOUNG, JR 2,924,657
TAPE TRANSMITTER CONTROL CIRCUIT
Filed Oct. 28, 1958
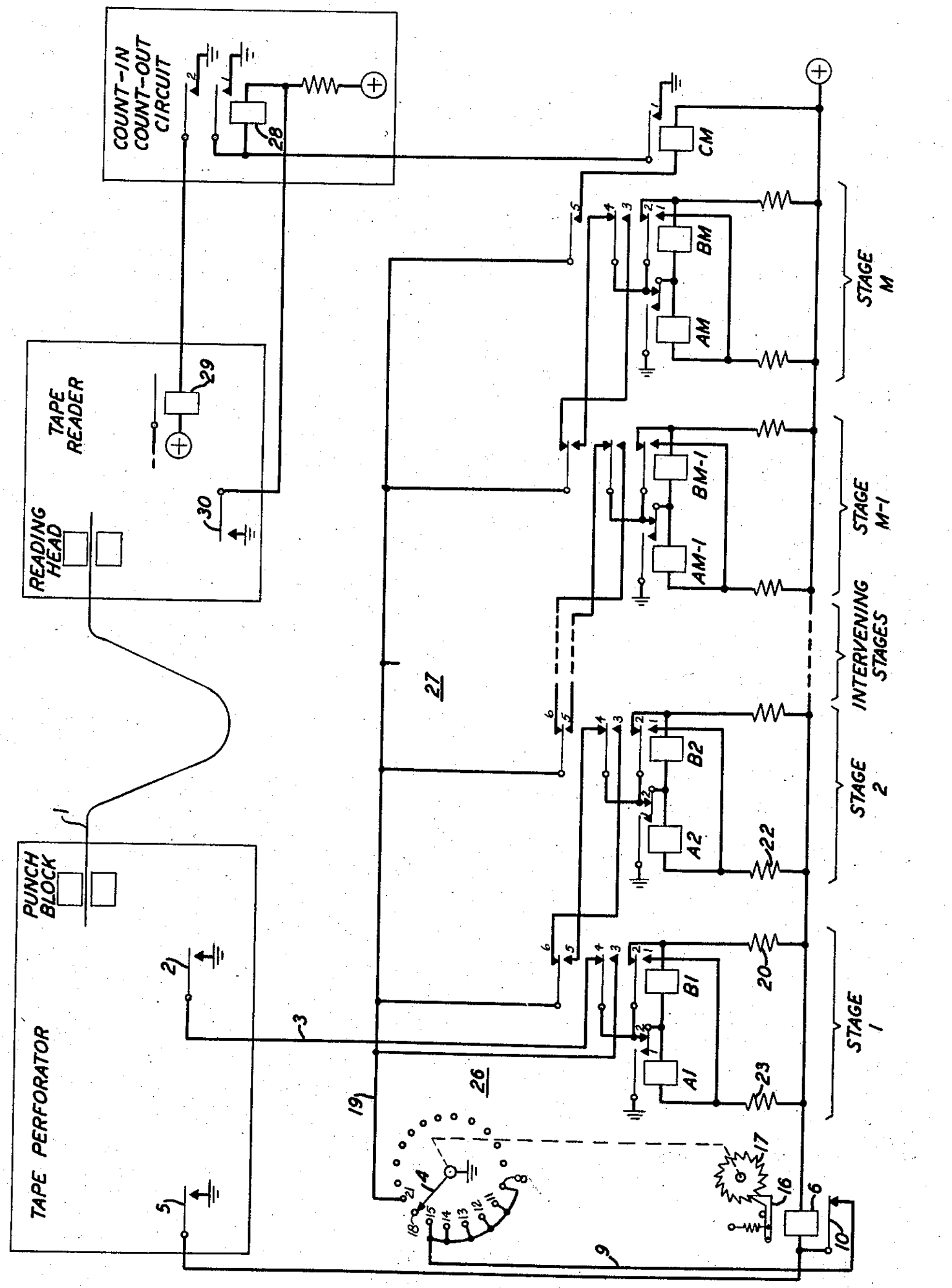
INVENTOR
W.R. YOUNG JR.
BY
S.E. Hollander
ATTORNEY United States Patent Office 2,924,657 Patented Feb. 9, 1960

2,924,657

TAPE TRANSMITTER CONTROL CIRCUIT

William R. Young, Jr., Summit, N.J., assignor to Bell Telephone Laboratories, Incorporated, New York, N.Y., a corporation of New York Application October 28, 1958, Serial No. 770,193

17 Claims. (Cl. 178—17)

This invention relates to tape reader control circuits and more particularly to a control circuit for a reader in a continuous tape system.

Recent innovations in the area of high speed tape reading devices have given rise to a number of problems incident to a disparity in the speed of operation between a tape perforator or reperforator and an associated tape reader or transmitter.

Unless precautionary arrangements are undertaken, the relatively greater speed of the reader in a continuous tape arrangement induces an inherent proclivity to a taut tape condition. Since serious and costly delays in the operation of the remainder of the system may result when a taut tape condition is encountered, it is essential in the operation of high speed reading devices to insure that a complete message is available to the reader before reading begins. An equally important criterion in a continuous tape system is provision for a sufficient quantity of tape following the "end-of-message" signal to permit the reader to read to the end of the message without producing a taut tape condition.

Prior art devices have included the use of count-in-count-out circuits which store the aggregate total difference between the number of end-of-message signals received from the perforator and those received from the reader, to prevent a taut tape situation. However, a number of inescapable limitations attach to their utilization. In those prior art devices which, for example, transmit a count-in signal on the advent of the perforation of an end-of-message signal, a taut tape condition may easily ensue. Since in a continuous tape system the mere indication of the storage of a complete message, without more, is insufficient to insure that the reader may read to the end of the entire stored message, a taut tape condition is not necessarily prevented. This risk will be present independent of the relative speed of reader and perforator.

Moreover, in those instances where prior art arrangements include automatic feed-out of a predetermined quantity of tape after an end-of-message signal is perforated by the tape perforator, and a differential in speed between perforator and reader exists, the reader speed may so far exceed that of the perforator that the tape will be drawn through the reader with sufficient speed to create a taut tape condition even though the tape is continuing to advance through the perforator under control of the automatic feed-out mechanism.

In short, the utilization of a count-in-count-out circuit where the count-in signal is immediately transferred to the count-in-count-out circuit on the perforation of an end-of-message signal or the use of an automatic tape feed-out arrangement after the perforation of an end-of-message signal, or combined arrangements thereof, is generally inadequate to insure the prevention of a taut tape condition.

Certain prior devices which employ "climbing-head" readers are adapted to prevent a taut tape condition by permitting physical movement of the reading head toward the perforator punch block. Allowing relative movement between the reading head and the stationary tape when no further tape can be drawn through the reader enables the reader to read the last recorded character without encountering taut tape difficulties.

However, the climbing-head transmitter is generally more costly and more complex than stationary readers. Moreover, climbing-head transmitters are not readily adaptable to high speed reading operations.

It is, therefore, an object of this invention to prevent the occurrence of a taut tape condition where a disparity in tape reader and perforator speeds exists.

An additional object of this invention is to permit the actuation of the tape reader only in instances when one or more complete messages are stored in the tape.

A further object of this invention is to condition the energization of the tape reader in a continuous tape system on the storage of a sufficient quantity of tape to permit the reader to read to the end of the message without encountering a taut tape condition.

An additional object of this invention is to delay the operation of a message count-in-count-out circuit until a predetermined number of characters comprising fill or next message characters have been perforated.

Another object of this invention is to provide a simplified tape reader control circuit to prevent the energization of the tape reader until a predetermined number of complete messages followed by a predetermined number of fill or message characters are stored in the tape.

The above and other objects of the invention are achieved in an illustrative embodiment in which a shift register, which is responsive to an end-of-message signal from the tape perforator, delays the transmission of the signal to a stored message count-in-count-out circuit until a predetermined number of characters are added to the tape to insure that the reader can read to the end of the message without encountering a taut tape condition.

The count-in-count-out circuit, of conventional design, is responsive to end-of-message signals from the tape reader to subtract from the total count of stored messages. Similarly, end-of-message signals from the tape perforator actuate the stored message count-in-count-out circuit to add to the total count.

The arrangement of the count-in-count-out circuit is adapted to prevent the energization of the tape reader until a predetermined number of messages remain in storage in the tape.

Since the shift register, which is interposed between the tape perforator and the count-in-count-out circuit, delays the transmission of an end-of-message indication from the perforator until the end-of-message signal or mark is shifted through each stage of the register, and since the perforator continues to automatically perforate and advance the tape during this procedure, a predictable quantity of tape is included after the perforation of the end-of-message signal and before the end-of-message signal actuates the count-in-count-out circuit.

The number of stages in the shift register is designed to provide an adequate quantity of tape following the end-of-message indication to permit the tape reader to read to the end of an entire message without encountering a taut tape condition and to prevent the energization of the tape reader until the appropriate quantity of tape is in storage.

The above and other objects and features of the invention may be more readily comprehended from the following detailed description and an examination of the drawing in which a schematic diagram of an embodiment of the invention discloses the shift register circuitry and the relative disposition of the count-in - count-out circuit, tape perforator and tape reader.

Referring now to the drawing, a tape perforator and tape reader are symbolically shown with a continuous tape 1 between the punch block of the tape perforator and reading head of the tape reader. The details of the tape perforator and reader are not disclosed as not essential to a comprehension of the present invention. Reference may be made to Patents No. 2,381,871 and No. 2,766,318 to W. M. Bacon et al. on August 14, 1945, and October 9, 1956, respectively, for a comprehensive delineation of the circuitry of the tape perforator and reader. A shift register circuit 27 including stages 1–M is shown for transferring an end-of-message mark or indication from the tape reader or perforator to the count-in - count-out circuit. The latter well-known circuit is shown symbolically and may illustratively take the form disclosed in Patent No. 2,575,329 to W. B. Blanton et al. of November 20, 1951.

The operation of the invention is initiated through the perforation of an end-of-message signal by the tape perforator which (through means not shown) momentarily operates contacts 2 in the tape perforator to apply a ground signal to conductor 3. Relay A1 operates over the No. 4 contacts of relay B1 and the No. 2 transfer contacts of relay A1. Relay A1 locks operated over its No. 1 contacts to ground.

As additional characters are perforated on the tape, sequence switch 26 is rotated. This follows from the operation of contacts 5 which, under control of an automatic feed-out timer (not shown), operate momentarily during the perforation of each character and, in turn, cause the operation of relay 6. Armature 16 of relay 6 drives ratchet wheel 17 which is mechanically coupled to arm 4 of the sequence switch 26.

For a comprehensive description of devices responsive to end-of-message codes and timed automatic feedout, reference may be made to Patent No. 2,374,264 to W. M. Bacon et al. of April 24, 1945, Patent No. 2,477,832 to R. G. Schuler of August 2, 1949, and Patent No. 2,502,654 to G. G. Keyes of April 4, 1950.

When the switch 4 advances clockwise to the first position 8 on which the contacts are strapped to additional contacts, a self-interrupting circuit may be traced over conductor 9 to contacts 10 on relay 6 and the winding of relay 6. The sequence switch 4 is driven over contacts 11—15 by the successive operation and release of relay 6 through contacts 10 and the self-interrupting circuit traced above.

Automatic self-stepping of the switch continues until the wiper arm 4 advances to the first position 18 beyond which the contacts are not strapped, at which time contacts 5 are again effective under control of the automatic feed-out timer referred to above. Once during each complete rotation, when the wiper arm 4 traverses contacts 21, ground is connected to shift lead 19 to advance information stored in the register by one stage in the manner herein explained.

It will be noted that a mark was placed in the shift register by the operation of relay A1 in response to the operation of contacts 2 of the perforator indicating an end-of-message signal, as described above. When contacts 2 are released, relay B1 operates over a path from ground, No. 1 contacts of relay A1, winding of relay B1, resistance 20 to positive battery.

Previously, relay B1 was prevented from operating in view of the ground condition on both sides of the winding of relay B1 over paths from ground, No. 1 contacts of relay A1 to the left side of winding of relay B1, and from ground, contacts 2 of the perforator, conductor 3, No. 4 contacts of relay B1, No. 2 contacts of relay B1 to the right side of winding of relay B1.

As additional characters are perforated in the tape under control of the automatic feed-out timer, wiper arm 4 rotates and, in passing contacts 21, applies a ground condition to conductor 19 which results in the operation of relay A2 over a path which may be traced from ground, wiper arm 4, contacts 21, conductor 19, No. 5 contacts of relay B1, No. 4 contacts of relay B2, No. 2 transfer contacts of relay A2, winding of relay A2, resistance 22 to positive battery. Simultaneously, the ground on conductor 19 short-circuits the winding of relay A1 causing that relay to release over a circuit which may be traced from conductor 19, No. 3 contacts of relay B1, No. 1 contacts of relay B1, resistance 23 to positive battery.

The operating path for relay B1, previously traced, is interrupted at the No. 1 contacts of relay A1, but relay B1 remains operated over the ground on conductor 19, No. 3 contacts of relay B1 and the No. 2 transfer contacts of relay A1. When wiper arm 4 passes contacts 21, the ground is removed from conductor 19 and relay B1 releases.

Relay B2 operates in consequence of the operation of relay A2 in the manner previously described for the operation of relay B1.

Thus the mark placed in the shift register stage 1 by the first end-of-message signal is transferred to stage 2 of the shift register and stage 1 is restored. In a similar manner, wiper arm 4 continues to rotate and sequentially connect a ground potential to conductor 19 thereby advancing the mark in the shift register to the next adjacent stage, until stage M is operated. On the following rotation of wiper arm 4 and the connection of ground to conductor 19, relay CM operates over the No. 5 contacts of relay BM. Relay CM releases when wiper arm 4 passes from contacts 21. However, the momentary closure of the No. 1 contacts of relay CM completes a circuit to operate relay 28 in the count-in - count-out arrangement which locks operated over its No. 1 contacts. This signal informs the counting circuit that a complete message plus sufficient following characters have been perforated to insure the reading of an entire message in the tape reader without encountering a taut tape condition.

The No. 2 contacts of relay 28 complete a path for the operation of start relay 29 in the tape reader to condition the reader for operation.

When the reader has read the complete message, the end-of-message perforation momentarily actuates contacts 30 through means not shown, to relaese relay 28 and restore the circuit to normal.

If it is assumed that the total number of contacts in the stepping switch (considering the strapped contacts as 1) includes N contacts, the shift pulse on conductor 19 occurs once in the perforation of N characters. Consequently, it may occur as early as the first character perforated after an end-of-message signal or it may occur as many as N characters later. Thus the number of characters required to produce an indication on relay CM where the register includes M stages varies in the range between $NM+1$ and $NM+N$. The value of N is consequently chosen to insure that the permissible variation falls within tolerable limits.

If N is made equal to 1 the stepper switch is eliminated and contacts 5 of the perforator are connected directly to conductor 19.

If after a first end-of-message indication has been shifted out of the first stage, a second end-of-message signal appears, stage 1 will again be marked as described above. This mark will be similarly transferred to the next higher stage each time a ground condition appears on conductor 19. This holds even in instances where the first and second end-of-message signals appear at such times as to be indicated in adjacent shift register stages.

Since two end-of-message signals are not registered as separate marks in the shift register unless a shift action through the application of a ground over conductor 19 has intervened, it is necessary to insure that the value N is smaller than the number of characters in the shortest message. However, a comparably longer shift register is required to effect a predetermined delay when the number N is made smaller. A compromise should, therefore, be effected in setting the number N in order that it be chosen as large as is consistent with minimum message length and with the requirement for keeping the variation in character count within desired limits.

The number N is easily varied by strapping the contacts as shown for contacts 8 and 11—15. However, the length of time required for arm 4 to traverse the strapped contacts must be relatively short in comparison to the time required to perforate a character or the shift pulse may occur late, i.e., after the perforation of N characters plus the number of characters perforated during the time required for arm 4 to traverse the strapped contacts.

Although a specific embodiment of the invention has been illustrated, it will be obvious to those skilled in the art that various modifications may be made without departing from the spirit and scope of the invention including the use of transistor, ferroelectric, or magnetic core shift registers in lieu of the electromechanical register shown, and in lieu of the stepping switch used for count division.

What is claimed is:

1. A tape reader control system including a continuous tape, a tape perforator, a tape reader, a counting circuit, means in said tape perforator responsive to the perforation of end-of-message signals for transferring said signals to said counting circuit, means in said counting circuit responsive to the reception of said signals for indicating the number of said signals, means in said perforator for advancing said tape in response to said end-of-message signals, and means serially interposed between said perforator and said counting circuit for delaying the transfer of said signals from said perforator to said counting circuit until a predetermined quantity of tape has been advanced.

2. A tape control system including a continuous tape, a tape perforator, a tape reader, a counting circuit, means in said tape perforator responsive to the reception of end-of-message signals for coupling said signals to said counting circuit, means in said counting circuit responsive to the reception of said signals for indicating the number of said signals, means in said perforator for advancing a predetermined quantity of tape in response to said end-of-message signals, means serially interposed between said perforator and said counting circuit for delaying the coupling of said signals from said perforator to said counting circuit until a predetermined quantity of tape has been advanced, and additional means in said counting circuit responsive to the indication of a predetermined number of said signals for controlling the operation of said reader.

3. A tape read-out control system including a continuous tape, a tape perforator, a tape reader, a counting circuit, means in said tape perforator responsive to the perforation of end-of-message signals for conveying said signals to said counting circuit, means in said counting circuit responsive to the reception of said signals for indicating the number of said signals, means in said tape perforator for advancing a predetermined quantity of said tape in response to the perforation of said end-of-message signals, shift register means serially interposed between said perforator and said counting circuit for delaying the transfer of said signals from said perforator to said counting circuit until a predetermined quantity of tape has been advanced, means for coupling an initial stage of said shift register to said perforator, and means for coupling a terminal stage of said shift register to said counting circuit.

4. A tape read-out control system including a continuous tape, a tape perforator, a tape reader, a counting circuit, means in said tape perforator responsive to the reception of end-of-message signals for transferring said signals to said counting circuit, means in said counting circuit responsive to the transfer thereto of said signals for indicating the number of said signals, means in said perforator for advancing said tape in response to the perforation of said end-of-message signals, shift register means serially interposed between said perforator and said counting circuit for delaying the transfer of said signals from said perforator to said counting circuit until a predetermined quantity of tape has been advanced, means for coupling an initial stage of said shift register to said perforator, means for coupling a terminal stage of said shift register to said counting circuit, and means in said counting circuit responsive to the indication of a predetermined number of said signals for governing the operation of said tape reader.

5. A tape control system including a continuous tape, a tape perforator, a tape reader, said reader being adapted to operate at a relatively more rapid rate than said perforator, a counting circuit, means in said tape perforator responsive to the reception of end-of-message signals for coupling said signals to said counting circuit, means in said counting circuit responsive to the reception of said signals for indicating the number of said signals, means in said perforator for advancing a predetermined quantity of tape in response to said end-of-message signals, means serially interposed between said perforator and said counting circuit for delaying the coupling of said signals from said perforator to said counting circuit until a predetermined quantity of tape has been advanced, and additional means in said counting circuit responsive to the indication of a predetermined number of said signals for controlling the operation of said reader.

6. A tape read-out control system including a continuous tape, a tape perforator, a tape reader, said tape reader being adapted to read at a relatively greater rate than said perforator can perforate, a counting circuit, means in said tape perforator responsive to the reception of end-of-message signals for transferring said signals to said counting circuit, means in said counting circuit responsive to the transfer thereto of said signals for indicating the number of said signals, means in said perforator for advancing said tape in response to the perforation of said end-of-message signals, shift register means serially interposed between said perforator and said counting circuit for delaying the transfer of said signals from said perforator to said counting circuit until a predetermined quantity of tape has been advanced, means for coupling an initial stage of said shift register to said perforator, means for coupling a terminal stage of said shift register to said counting circuit, and means in said counting circuit responsive to the indication of a predetermined number of said signals for governing the operation of said tape reader.

7. A tape read-out system including a continuous tape, a tape perforator, a tape reader, a counting circuit, first means in said tape perforator responsive to the perforation of an end-of-message signal for transferring said signal to said counting circuit, means in said counting circuit responsive to the reception of said signal for indicating the counting of said signal, second means in said perforator for advancing a predetermined quantity of tape in discrete steps in response to the perforation of said end-of-message signal, shift register means serially interposed between said perforator and said counting circuit for delaying the transfer of said signal from said perforator to said counting circuit until a predetermined quantity of tape has been advanced, said first means in said perforator responsive to the perforation of an end-of-message signal being adapted to condition an initial stage of said shift register to a mark condition to store said end-of-message signal, means in said shift register for sequentially advancing said end-of-message signal to succeeding stages of said shift register in response to each discrete step advance of said tape, means for coupling a final stage of said shift register to said counting circuit, and means in said counting circuit responsive to the reception of a predetermined number of end-of-message signals from said final stage for energizing said tape reader.

8. A tape read-out control system including a continuous tape, a tape perforator, a tape reader, a counting circuit, first means in said tape perforator responsive to the perforation of end-of-message signals for coupling said signals to said counting circuit, means in said counting circuit responsive to the reception of said signals for indicating the number of said signals, second means in said perforator for advancing a predetermined quantity of said tape in discrete steps responsive to the perforation of an end-of-message signal, shift register means serially interposed between said perforator and said counting circuit for delaying the coupling of said signals from said perforator to said counting circuit until a predetermined quantity of tape has been advanced, a stepping switch having a plurality of contact positions and a wiper arm, said switch being adapted to rotatively advance from one contact position to another in response to the advance of a discrete quantity of tape, said first means in said tape perforator responsive to the perforation of end-of-message signals being adapted to condition an initial stage of said shift register to store said end-of-message signal, means for advancing said signal to succeeding stages of said shift register in response to a complete rotation of said arm, means for coupling a terminal stage of said shift register to said counting circuit, and means in said counting circuit responsive to the reception of a predetermined number of end-of-message signals from said terminal stage for conditioning said tape reader to a reading condition.

9. A tape read-out control system in accordance with claim 8 wherein each of said shift register stages comprises two relays.

10. A tape reader control system including a continuous tape, a tape perforator, a tape reader, a counting circuit, first means in said tape perforator responsive to the reception of end-of-message signals for transferring said signals to said counting circuit, means in said counting circuit responsive to the reception of said signals for counting the number of said signals, second means in said tape perforator for advancing a predetermined quantity of tape in discrete steps responsive to the perforation of an end-of-message signal, shift register means serially interposed between said perforator and said counting circuit for delaying the transfer of said signals from said perforator to said counting circuit until a predetermined quantity of tape has been advanced, a stepping switch coupled to said shift register having a plurality of contact positions and a wiper arm adapted to engage each of said contacts successively, second means in said tape perforator responsive to the reception of an end-of-message signal for conditioning an initial stage of said shift register to store said end-of-message signal, means for rotating said arm from one contact position to a following position in response to the advance of a discrete quantity of tape, means connected to one of said contact positions for advancing said mark condition to succeeding stages of said shift register, said switch including N contact positions, said shift register including M stages, means for coupling a terminal stage of said shift register to said counting circuit, and means in said counting circuit responsive to the reception of a predetermined number of end-of-message signals from said terminal stage for governing the operation of said tape reader, wherein the number of discrete quantities of tape advanced is in the range between $NM+1$ and $NM+N$.

11. A tape control system including a continuous tape, a tape perforator, a tape reader, a count-in - count-out circuit, means in said tape perforator responsive to the reception of end-of-message signals for coupling said signals to said count-in - count-out circuit to increase the count therein, means in said count-in - count-out circuit for indicating the total count therein, means in said perforator for advancing a predetermined quantity of tape in response to each of said end-of-message signals, means serially interposed between said perforator and said count-in - count-out circuit for delaying the coupling of said signals from said perforator to said count-in - count-out circuit until a predetermined quantity of tape has been advanced, additional means in said count-in - count-out circuit responsive to the indication of a predetermined number of said signals for controlling the operation of said reader, and means in said tape reader responsive to the reading of an end-of-message signal for governing said count-in - count-out circuit to reduce the count therein.

12. A tape read-out control system including a continuous tape, a tape perforator, a tape reader, a count-in - count-out circuit, means in said tape perforator responsive to the reception of end-of-message signals for transferring said signals to said count-in - count-out circuit to augment the total count therein, means in said count-in - count-out circuit for indicating the total count therein, means in said perforator for advancing said tape in response to the perforation of said end-of-message signals, shift register means serially interposed between said perforator and said count-in - count-out circuit for delaying the transfer of said signals from said perforator to said count-in - count-out circuit until a predetermined quantity of tape has been advanced, means for coupling an initial stage of said shift register to said perforator, means for coupling a terminal stage of said shift register to said count-in - count-out circuit, means in said count-in - count-out circuit responsive to the indication of a predetermined number of said signals for governing the operation of said tape reader, and means in said tape reader responsive to the reading of an end-of-message signal for operating said count-in - count-out circuit to diminish the total count therein.

13. A tape read-out system including a continuous tape, a tape perforator, a tape reader, a count-in - count-out circuit, first means in said tape perforator responsive to the perforation of an end-of-message signal for transferring said signal to said count-in - count-out circuit to increase the total count therein, means in said count-in - count-out circuit for indicating the total count therein, second means in said perforator for advancing a predetermined quantity of tape in discrete steps in response to the perforation of said end-of-message signals, shift register means serially interposed between said perforator and said count-in - count-out circuit for delaying the transfer of said signals from said perforator to said count-in - count-out circuit until a predetermined quantity of tape has been advanced, said first means in said perforator responsive to the perforation of an end-of-message signal being adapted to condition an initial stage of said shift register to a mark condition to store said end-of-message signal, means in said shift register for sequentially advancing said end-of-message signal to succeeding stages of said shift register in response to each discrete step advance of said tape, means for coupling a final stage of said shift register to said count-in - count-out circuit, means in said count-in - count-out circuit responsive to the increase of the total count therein to a predetermined number for energizing said tape reader, and means in said tape reader responsive to the reading of an end-of-message signal for controlling said count-in - count-out circuit to decrease the total count therein.

14. A tape read-out control system including a continuous tape, a tape perforator, a tape reader, said tape reader being adapted to read at a relatively greater rate than said perforator can perforate, a count-in - count-out circuit, means in said tape perforator responsive to the reception of end-of-message signals for transferring said signals to said count-in - count-out circuit to increase the aggregate count therein, means in said perforator for advancing said tape in response to the perforation of said end-of-message signals, shift register means serially interposed between said perforator and said count-in - count-out circuit for delaying the transfer of said signals from said perforator to said count-in - count-out circuit until a predetermined quantity of tape has been advanced, means for coupling an initial stage of said shift register to said perforator, means for coupling a terminal stage of said shift register to said count-in-count-out circuit, means in said count-in-count-out circuit responsive to the increase of the aggregate count therein to a predetermined number for governing the operation of said tape reader, and means in said tape reader responsive to the reading of an end-of-message signal for governing said count-in-count-out circuit to reduce the aggregate count therein.

15. A tape control system including a continuous tape, a tape perforator, a tape reader, said tape reader being adapted to operate at a higher rate than said perforator, a count-in-count-out circuit, means in said tape perforator responsive to the reception of end-of-message signals for coupling said signals to said count-in-count-out circuit to augment the total count therein, means in said perforator for advancing a predetermined quantity of tape in response to said end-of-message signals, means serially interposed between said perforator and said count-in-count-out circuit for delaying the coupling of said signals from said perforator to said count-in-count-out circuit until a predetermined quantity of tape has been advanced, additional means in said count-in-count-out circuit responsive to the augmentation of the total count therein to a predetermined number for controlling the operation of said reader, and means in said reader responsive to the reading of an end-of-message signal for governing said count-in-count-out circuit to reduce the total count therein.

16. A tape read-out control system including a continuous tape, a tape perforator, a tape reader, said tape perforator being arranged to advance the tape at a slower rate than said reader, a count-in-count-out circuit, means in said tape perforator responsive to the reception of end-of-message signals for transferring said signals to said count-in-count-out circuit to increase the aggregate count therein, means in said perforator for advancing said tape in response to the perforation of said end-of-message signals, shift register means serially interposed between said perforator and said count-in-count-out circuit for delaying the transfer of said signals from said perforator to said count-in-count-out circuit until a predetermined quantity of tape has been advanced, means for coupling an initial stage of said shift register to said perforator, means for coupling a terminal stage of said shift register to said count-in-count-out circuit, means in said count-in-count-out circuit responsive to the increase of the aggregate count to a predetermined number for governing the operation of said tape reader, and means in said tape reader responsive to the reading of an end-of-message signal for controlling said count-in-count-out circuit to decrease the aggregate count.

17. A tape read-out system including a continuous tape, a tape perforator, a tape reader, said tape reader being adapted to advance the tape therethrough at a faster rate than said perforator, a count-in-count-out circuit, first means in said tape perforator responsive to the perforation of an end-of-message signal for transferring said signal to said count-in-count-out circuit to raise the total count therein, second means in said perforator for advancing a predetermined quantity of tape in discrete steps in response to the perforation of said end-of-message signals, shift register means serially interposed between said perforator and said count-in-count-out circuit for delaying the transfer of said signals from said perforator to said count-in-count-out circuit until a predetermined quantity of tape has been advanced, said first means in said perforator responsive to the perforation of an end-of-message signal being adapted to condition an initial stage of said shift register to a mark condition to store said end-of-message signal, means in said shift register for sequentially advancing said end-of-message signal to succeeding stages of said shift register in response to each discrete step advance of said tape, means for coupling a final stage of said shift register to said count-in-count-out circuit, means in said count-in-count-out circuit responsive to the raising of the total count therein to a predetermined number to energize said tape reader, and means in said reader responsive to the reading of an end-of-message signal for governing said count-in-count-out circuit to reduce the number of said signals indicated.

No references cited.